Nov. 19, 1968 L. M. CRUMRINE, JR 3,411,856
PROCESS AND MACHINE FOR FORMING A DECORATIVE PATTERN ON CANDLES
Filed Feb. 28, 1966 3 Sheets-Sheet 1

INVENTOR.
Lucius M. Crumrine, Jr.
BY
Attorneys

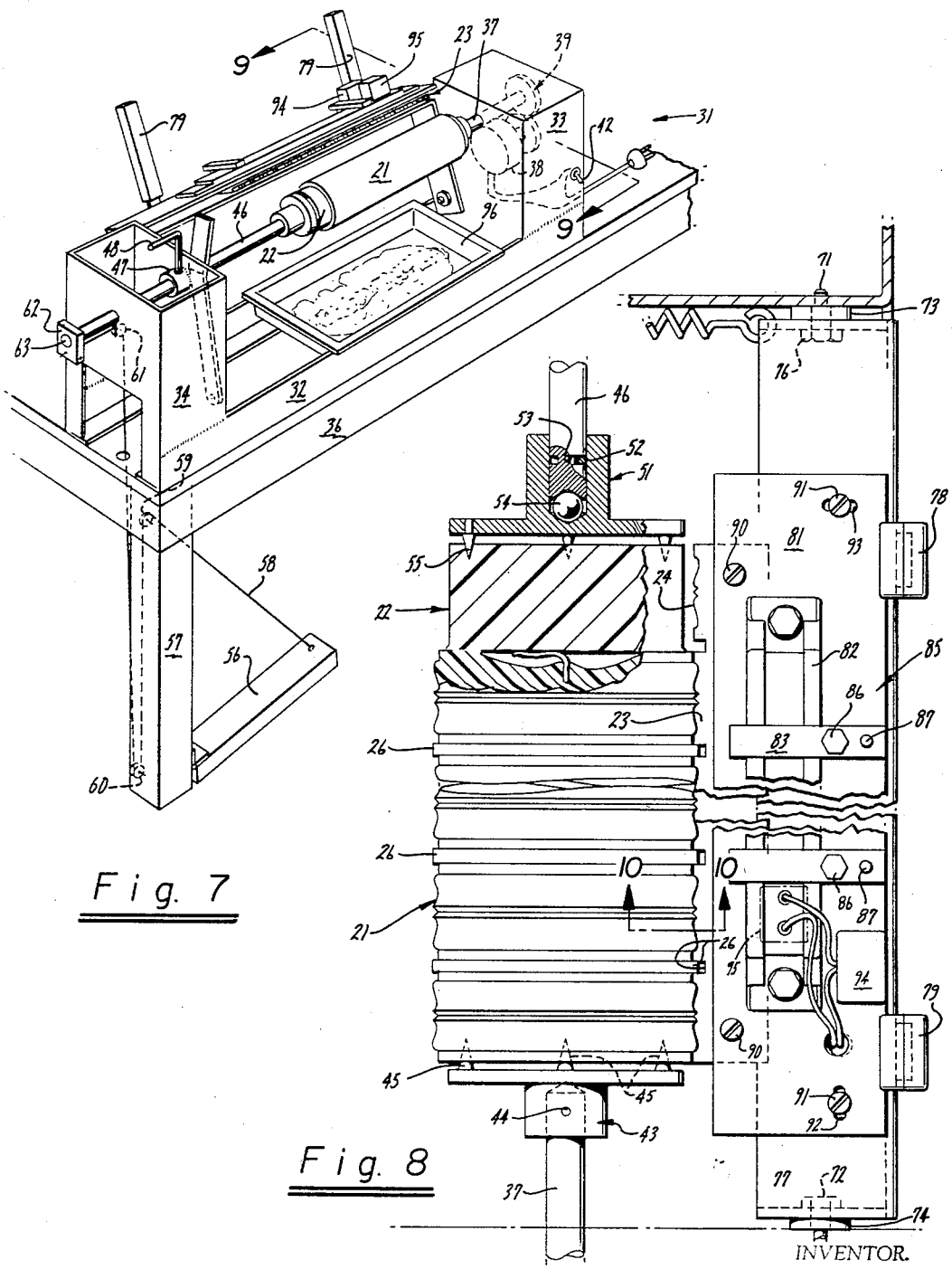

INVENTOR.
Lucius M. Crumrine, Jr.
BY
Attorneys

United States Patent Office 3,411,856
Patented Nov. 19, 1968

3,411,856
PROCESS AND MACHINE FOR FORMING A
DECORATIVE PATTERN ON CANDLES
Lucius M. Crumrine, Jr., Burlingame, Calif., assignor to
Bluegate Candle Company, Montara, Calif., a corporation of California
Filed Feb. 28, 1966, Ser. No. 530,534
12 Claims. (Cl. 431—126)

ABSTRACT OF THE DISCLOSURE

A candle decorating machine and process including means for horizontally supporting and rotating a candle and a heated cutting and forming member such that the latter is selectively brought into lateral engagement with the side of the candle. Circumferential grooves and longitudinal ridges are formed in the candle by selective operation of the member to form a decorative pattern in which the longitudinal ridges conform to the surface outline along the candle.

---

This invention relates to a process and machine for forming a decorative pattern on candles and the like and to the decorated candle produced thereby.

Heretofore, candles have been decorated by the application of various colored waxy coatings or paints to achieve multi-colored and three-dimensional decorative effects. Such coatings have been limited in their usefulness, primarily because they must be applied when in a softened or melted consistency in order to achieve a bond between the coating and the candle. Generally, the coating cannot be deformed only applied without destroying its translucence. This limits the resulting pattern to a shallow, smooth contour which generally conforms to the contour of the candle. In order to form deeply relieved patterns having a high degree of contour, split molds are required.

Such coatings are difficult to control when heated sufficiently to adhere well to the candle wax, and are usually applied by dipping the candle or portion thereof in a melted pool of the coating material. When thus applied, the contour is obviously limited to that of the candle itself.

It is a general object of the invention to provide a process and machine for forming a decorative pattern on candles and the candle produced thereby which will overcome the above named disadvantages.

It is another object of the invention to provide a process and machine of the above character and candle produced thereby in which the candle is decorated by heating, removing and shaping portions of the exterior surface of a candle, and of overlain wax coatings thereon.

It is another object of the invention to provide a process and machine of the above character in which the candle produced thereby is decorated to achieve both sharply contoured surface (highly relieved) and multi-colored effects.

Another object of the invention is to provide a process and machine of the above character in which the sidewall of the candle produced thereby is decorated from end to end, and in which a combination of decorative effects can be achieved including decorative distribution of color in colored bands and ridges.

It is another object of the invention to provide a machine of the above character in which the candle is rotatably mounted in a machine and the entire decorating process is performed on the candle while the same is rotating.

It is another object of the invention to provide a machine of the above character in which a variety of decorative effects can be achieved using substantially the same equipment.

Another object of the invention is to provide a machine of the above character which utilizes an easily replaceable heated blade having a predetermined pattern thereon for forming the decorative pattern.

Another object of the invention is to provide a candle of the above character which is produced from a conventional block candle and coatings of applied melted wax or other decoration, the latter being deformed into the desired decorative pattern.

These and other objects of the invention will be apparent from the following description when taken with the accompanying drawings of which:

FIGURES 1A through 6A are plan views of a candle being processed according to the invention, the figures illustrating the appearance of the candle at each step of the process and the relative position and movement of the forming member thereto.

FIGURES 1B through 6B are transverse cross-sectional views of the candle and members as depicted in FIGURES 1A through 6A, respectively.

FIGURE 7 is a perspective view of a machine carrying out the process of the invention.

FIGURE 8 is a plan view, partly in section, of the machine of FIGURE 7.

Figure 1A:
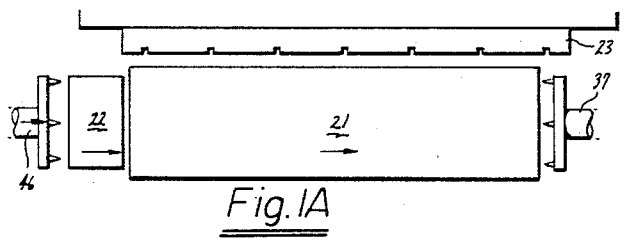
Figure 1B:
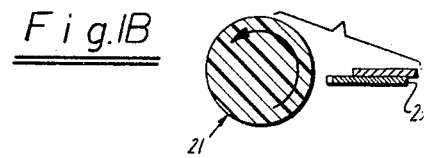
Figure 2A:
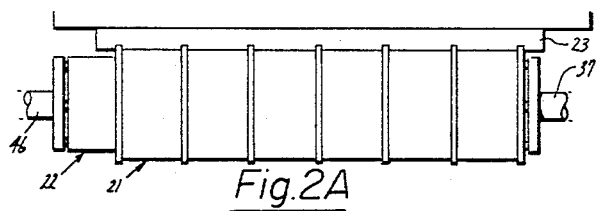
Figure 2B:
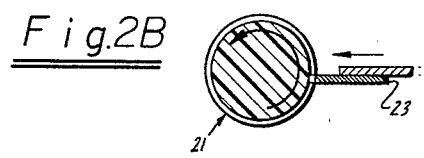

Referring to FIGURES 1A, B through 6A, B, there is shown the development of the external appearance of a candle 21 being decorated according to the process of the invention. The candle 21 may be selected of any ordinary candle shape having a relatively uniform exterior, the conventional cylindrical block candle of the type cast in a mold being preferred. A short end block 22 of wax having a cross-section dimension somewhat less than that of the candle 21 is affixed to the top end of the candle by heating and coating the faces to be joined in a bath of melted wax and pressing the candle and block together. The end block 22 serves to protect the top of the candle from being marred during processing and also serves as means for permitting other means to support the block and candle as hereinafter described.

The candle 21 and block 22 are mounted for horizontal rotation adjacent a heated member 23, having one face 24 which is provided with a predetermined pattern. The mechanism for supporting and rotating the candle and the forming member will be presently described. During each of the steps of the process, the candle is being rotated by the mechanism, and, usually, the entire process is carried out without stopping the rotation.

The face 24 of the member 23 is brought into contact with the sidewall of the rotating candle (FIGURES 1A, B, 2A, B) to thereby form circumferential grooves 26 on the sidewall of the candle, the grooves being formed with a shape which is complementary to that of the face 24. During the formation of the grooves 26, the face 24 of the member 23 is maintained in constant forced contact with the sidewall of the candle for one or more revolutions. During this time, the exterior of the candle body is heated and rendered plastic. It will be seen that advantage is taken of this plastic nature during later steps and before the candle exterior cools.

Figure 3A:
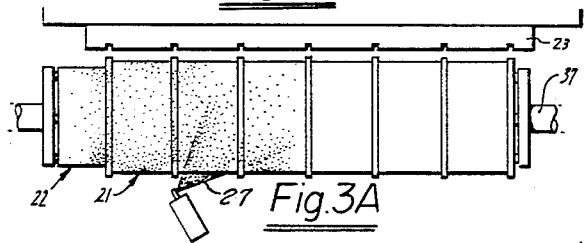
Figure 3B:
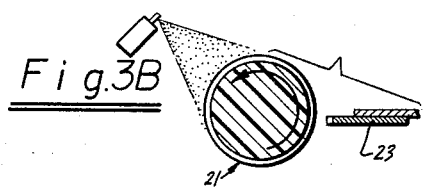
Figure 4A:
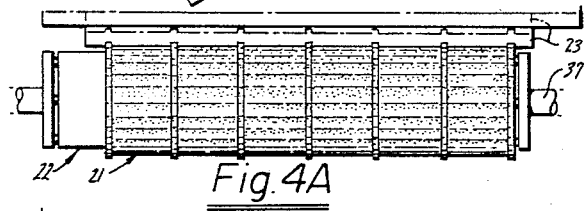
Figure 4B:
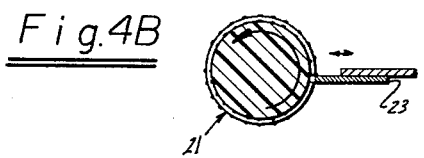
Figure 5A:
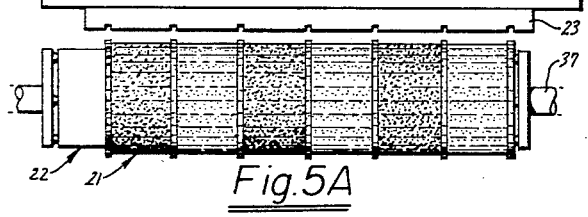
Figure 5B:
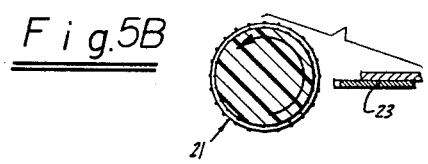
Figure 6A:
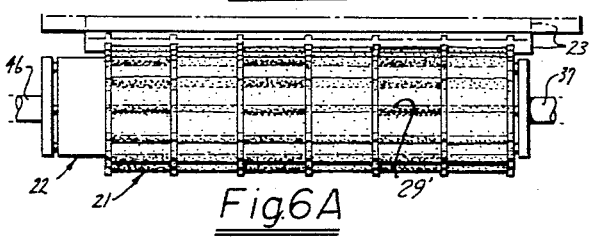
Figure 6B:
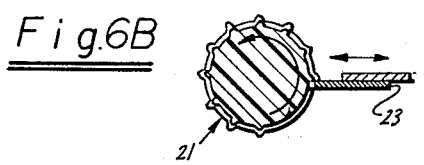
Figure 9:
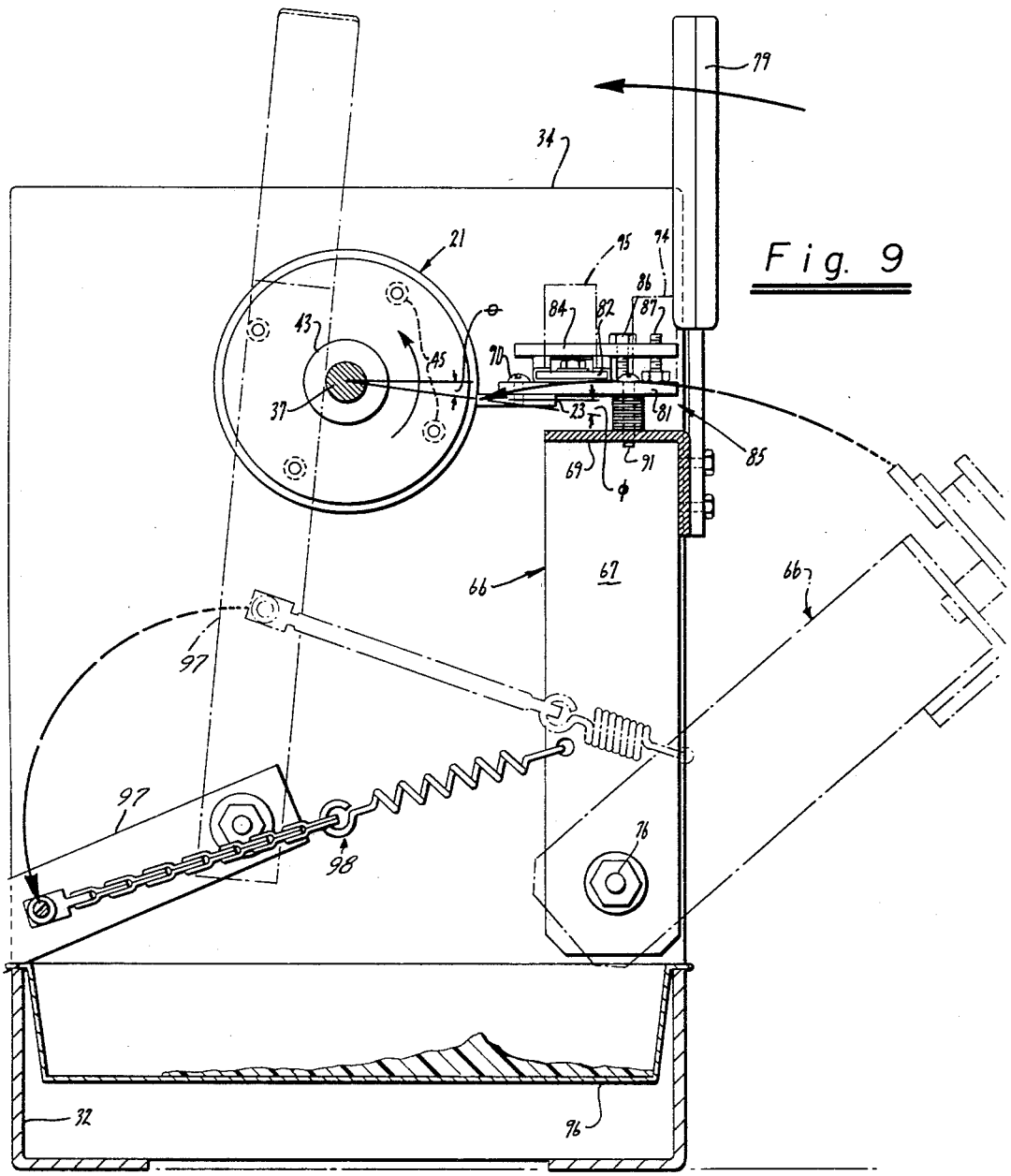
FIGURE 9 is a cross-sectional view of the machine taken along the lines 9—9 of FIGURE 7.
Figure 10:
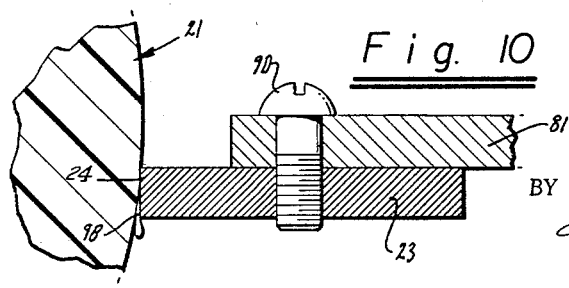
FIGURE 10 is a cross-sectional view of the machine taken along the lines 10—10 of FIGURE 8.

After formation of the grooves, the member 23 is removed from the candle and the candle is sprayed with a colored surface film 27 such as a gold colored paint (FIGURES 3A, B). The member 23 is then reciprocated lightly back and forth against the side of the rotating candle to partially remove the surface film and partially embed it into the heated, softened outer layer of the candle (FIGURES 4A, B).

Some or all of the candle is then painted with bands 28 of highly colored wax as by holding a conventional paintbrush containing melted wax to be applied in contact with the rotating candle. The color of the melted wax is selected to harmonize with that of the base color of the candle and if several colors are used, they are selected for an overall harmonious and pleasing effect. Usually, no more than two colors in addition to the base color are utilized, the colors being alternated in bands about the candle and being separated by much narrower gold bands which are retained on the candle throughout the operation subsequent to the spraying step recited above. To this end, the gold bands are made to conform to the original surface of the candle, as folded, by constructing the forming member 23 with spaced relieved sections 25 which do not contact the candle, as hereinafter described.

As previously noted, the candle exterior has been heated and softened in the previous steps and therefore it permits the applied coatings to retain their heat so that the coatings, and, if desired, even a layer of the candle body, can be deformed radically without destroying the natural translucence of the way. The final step of the decoration of the candle uses the heat content and plastic nature of this outer layer of the candle by permitting the colored wax coating and/or the layer to be moved or pushed into intermittetnt longitudinal ridges 29 along the candle by the action of the member 23. The latter is forced into the sidewall of the candle to push the soft outer portions of wax into ridges 29. The amount of intermittent pressure applied controls the amount of base candle wax moved; at low pressure, only the applied wax coating or a portion thereof is moved, and at high pressure, both the applied coatings of wax and a layer of the base material is moved to form the ridges 29.

The process of forming the decorative pattern on a candle as set forth above has been very satisfactory in achieving a highly contoured or relieved candle decoration having a three-dimensional effect. The decoration is characterized by a plurality of parallel circumferential grooves longitudinally spaced along the candle and having varying depths. The decoration further includes a plurality of longitudinal ridges equally spaced about the candle, overlying the grooves and generally conforming to the longitudinal outline of the grooves.

The capability of the process to achieve the aforementioned decorative effects is principally attributed to the combination of the heated and softened underlying layer of the candle body which is created during the making of the grooves 26 which permits the applied decorative materials to be pushed into ridges 29 without causing loss of translucence of either the exposed body exterior or of the decorative material in the ridges. Furthermore, an excellent bond is obtained between the applied decorative materials (molten wax or paint) and that of the candle base material. This bond results from the pre-heated and softened condition of the candle base material when the decorative material is applied and is maintained even after formation of the longitudinal ridges.

FIGURES 7 through 10 illustrate apparatus suitable for forming a candle according to the foregoing process. The apparatus generally includes a unitary lathe-like structure 31 which comprises a bed 32 which carries spaced tailstock 33 and headstock 34. The structure 31 is supported at a suitable working height on a bench 36.

A driving shaft 37 is journalled for rotation in the headstock and is driven by (a slow speed) electric motor 38 mounted in the headstock and rotatably connected to the shaft 37 by suitable means such as gearing 39. Wires 41 connect the motor to a source of electric power through switch 42 which is mounted in an easily accessible position of the headstock.

The free end of the shaft 37 extends a short distance into the region between the headstock and tailstock and is provided with a driving head 43 secured against rotation thereto with a pin 44. A plurality of sharp projections 45 are formed on the head 43 and extend axially and away from the shaft for the purpose of penetrating and rotationally engaging the one end of the candle 21.

A spindle 46 is carried for sliding motion in the tailstock 33 and through a collar 47 mounted thereto. The spindle is axially aligned with the shaft 37 and adjustably spaced therefrom, the spacing being maintained by a screw clamp 48 threadedly passing through the collar and adapted to engage the spindle.

The end of the spindle 46 adjacent the driving head 43 carries a driven head 51 which is rotatably secured to the spindle by suitable means such as a pin 52 which lies in a circumferential groove 53 formed on the spindle and secured through the head 51. The end thrust between the head 51 and the spindle is borne by a ball 54 which facilitates frictionless rotation of the driven head on the spindle. The side of the driven head 51 facing the driving head 43 is provided with a plurality of axially directed projections 55 for engaging the other end of a candle.

There is provided a foot treadle 56 having one end hingedly secured to a leg 57 of the bench 36. A cable 58 is fastened to the other end of the treadle and is passed over pulleys 59, 60 and 61 mounted on the bench 36, leg 57 and headstock 34, respectively. The other end of the cable 58 is attached to an end cap 62 affixed to the outer end 63 of the spindle. By this means, downward force applied to the treadle 56, as by being pressed on by the foot of the operator, causes the cable 58 to pull the end cap 62, and carry the spindle axially toward the headstock to thereby forceably engage a candle 21.

A yoke 66 comprising downward extending legs 67, 68 and a horizontal crosspiece 69 is mounted for reciprocating motion toward and away from the axis of the spindle and shaft. The yoke 66 is supported on studs 71, 72 extending inwardly from the lower rear portions of the headstock and tailstock, the studs extending through the legs 67, 68 and being retained thereto by spacers 73, 74 interposed between the legs and the headstock and tailstock, respectively, and nuts 76, 77 threadedly engaging these studs on the inner side of the legs to thereby maintain the yoke in spaced position with respect to the headstock and tailstock and moveable therebetween.

Handles 78 and 79 are secured to the crosspiece and extend vertically upward for easy access to the operator. The handles are constructed of a suitable heat insulating material such as wood so that they can be grasped with the bare hand of the operator although other members attached to this crosspiece are heated.

A support bar 81 to which a heating element 82 is secured by clamps 83, 84 forms an assembly which is mounted on the top of the crosspiece by bolts 86 and nuts 87, the assembly being maintained in spaced relation to the crosspiece by a plurality of washers 88 placed about on the bolts 86 and between the crosspiece and the support bar 81. The clamps 83, 84 are fulcrumed about the heads of the bolts 86 by cap screws 89 threadedly engaging the clamps at the end opposite from the heating element, the heads of the screws 89 riding on the support bar. In this way, the screws 89 force the adjacent end of the clamp upwardly and the opposite end of the clamp downwardly into firm engagement with the heating element to force the same into intimate contact with the support bar and provide a good heat conductive relation therebetween.

The forming member 23 is secured to the bottom of the support bar 81 by screws 90. The support bar 81 is adjustably mounted to the crosspiece 69 by screws 91 passing through slots 92, 93 in the support member and engaging the support bar near its ends. The slot 92 is elongate in the direction of movement of the support bar to thereby permit adjustment of the assembly 85 into uniform engagement along the sidewall of the candle; the slot 93 is elongate longitudinally of the support bar to permit slight deviations in the length of the assembly to thermal expansion or slight differences in dimensioning between the several members.

The heating element is connected with a source of electric power through a thermostat 94 which adjusts the amount of power supplied to the heating member so that the heating member and the forming member are maintained at the desired temperature of operation. A cover 95 protects the heating element wiring from being shorted by stray deposits of metallic paint used in decorating the candle.

In operation, a candle 21 is provided with an end block 22 as heretofore described, and the candle and end block are rotatably mounted between the heads 43 and 51, the candle being engaged by the projections of the heads. The forming member 23 is brought into contact with the candle to form circumferential grooves therein. It will be appreciated that the location and manner of attack by the forming member into the candle as well as the temperature of the forming member are parameters which must be optimized in order to achieve the best results. It has been found that when the forming member attacks the sidewall of the candle in such a manner that the sidewall is rotating upwardly across the face 24 of the member 23 and makes contact with the face in such a way as to form a downwardly opening V-shaped channel 98 therewith, that melted wax from the candle will form in the channel and be permitted to drop downwardly into a tray 96. Thus melted, wax does not run around the lower side of the candle and mar previously formed grooves.

In general, the above condition has been achieved by arranging the forming member to touch the candle on a line lying ten to fifteen angular degrees $\theta$ (with respect to the center of rotation of the candle) below a horizontal plane passing through the center. The face 24 is aligned so that its upper portion strikes the candle and embeds itself slightly therein (FIGURE 10), the lower portion of the face being spaced from the candle slightly so that intermediate portions form the V-shaped channel 98 with the sidewall of the candle. In the instance illustrated, the forming member lies in a horizontal plane and therefore makes an angle $\Phi$ with respect to the normal of the sidewall of the candle at the point of contact so that $\Phi$ is the same as the angle $\theta$. It is preferred that $\Phi$ be at least as great as, or greater than $\theta$ so that a sufficiently large channel 98 is provided for the molten wax to form into drops and drip off and away from the candle.

During the grooving operation, the operator is required to hold the forming member against the candle with a force of about five pounds. Since this can be tiring, it is preferred that the mechanism be provided with means for holding the cutting member against the candle during the grooving step. This is accomplished by pivotally connecting a lever 97 to the tailstock. A chain and spring linkage 98 connects the intermediate portion of the lever 97 to an intermediate portion of the leg 67. The possibility of connection of the lever are such that the chain and spring linkage travels slightly over center of its connection to the tailstock as the lever is brought fully down against the bed of the frame so that the lever is stable thereat. When set in the lower position, the length of the chain and the type of spring are selected so that a tension of about five pounds is applied to the yoke 66.

It has been found that optimum performance is obtained when the member 23 is heated to a high temperature but safely below the flash point of the wax (typically 450° F.). A preferred temperature is from 300 to 400° F. Under such conditions, a satisfactory rotation speed for a three (3) inch candle is from between about 4 to 10 revolutions per minute, preferably about 7 revolutions per minute.

While I have shown and described a machine adapted for manual operation, I wish it understood that the principles explained herein are directly applicable to a machine having an automatic mechanism incorporated therein for directing the motion of the forming member such as by a cam and follower located between the driving shaft and the forming member.

Thus, there has been provided a novel process and machine for making a decorative pattern on a candle which is contoured and decorative. While a particular pattern has been illustrated herein, it will be understood that a wide variety of decorative effects can be achieved using the same principles. Thus, the longitudinal contour can be changed by using a blade having a differently shaped forming edge, and the number and depth of the longitudinal ridges can be changed by varying the timing and force with which the blade is pressed against the candle.

I claim:

1. A process for forming a decorative pattern on a candle and the like comprising the steps of rotating the candle, contacting the candle with a heated forming member having a predetermined pattern to cut and melt the sidewall of the candle and to form circumferential grooves thereon and forcing the member against the candle intermittently while the candle is still warm and its exterior softened to thereby push the softened outer portions of wax into spaced longitudinal ridges.

2. A process for forming a decorative pattern on a candle and the like comprising rotating the candle, contacting the candle with a heated forming member having a predetermined pattern to cut and melt the sidewall of the candle and to form circumferential grooves thereon, applying colored melted wax to portions of the candle and forcing the member against the candle intermittently to thereby push the applied colored wax into spaced longitudinal ridges along the candle.

3. A process for forming a decorative pattern on a candle and the like comprising rotating the candle, contacting the candle with a heated forming member having a predetermined pattern to cut and melt the sidewall of the candle and to form circumferential grooves thereon, applying a colored surface film on the sidewall of the candle, lightly reciprocating the forming member toward and away from the candle to thereby partially remove the surface film and to partially embed the surface film into the candle, applying circumferential bands of colored materials to portions of the candle, and forcing the forming member against the candle intermittently to thereby push the applied material into spaced longitudinal ridges along the candle.

4. A process as in claim 3 in which the steps are carried out within a short time of each other such that when the longitudinal ridges are formed the portions of the candle about the outer surface thereof are still in a softened, heated condition due to being warmed during the step in which the grooves are formed by the heated member so that the subsequently applied wax becomes intimately fused to the body.

5. A decorative candle comprising a cylindrical body of candle wax, said body having a plurality of parallel circumferential grooves longitudinally spaced therealong, and a plurality of parallel longitudinally extending ridges spaced about the candle and overlying the grooves, said ridges overlying and conforming to the longitudinal outline of the grooves.

6. A machine for making decorated candles comprising means for mounting and rotating a cylindrical candle in a horizontal plane with respect to its axis of symmetry, a cutting and forming member, means for mounting said member for movement toward and away from a candle mounted in said mounting means, and means for heating said member, said heated cutting and forming member being positioned so that when moved into contact with the sidewall of the candle, the candle is contacted laterally at points lying on a line parallel to and below a horizontal plane cutting the candle through its center of rotation.

7. A machine for making decorated candles comprising means for mounting and rotating a cylindrical candle in a horizontal plane with respect to its axis of symmetry, a cutting and forming member, means for mounting said member for movement toward and away from a candle mounted in said mounting means, and means for heating said member, said cutting and forming member being provided with a face adapted to contact the candle, the candle being rotated so that the surface thereof contacted is travelling upwardly past said face.

8. A machine as in claim 7 in which said face is constructed and positioned with respect to the candle that when the upper portion of the face is in contact with the candle and partially embedded therein due to melting action thereof, the lower portion lies away from the surface to thereby form a downwardly facing open channel with the sidewall of the candle, the channel serving to provide a space for the formation of melted wax drops which can thereby fall freely away from the candle surface.

9. A machine for making decorated candles comprising means for mounting and rotating a cylindrical candle in a horizontal plane with respect to its axis of symmetry, a cutting and forming member, means for mounting said member for movement toward and away from a candle mounted in said mounting means, and means for heating said member, said cutting and forming member comprising a flat plate of finite thickness, one side of said flat plate being mounted on said mounting means and in heat transfer relation to said heating means, the face adjacent said candle being provided with a pattern of predetermined decorative shape therealong and being formed at right angles to said side, said member being mounted so that the upper portion of the face contacts the candle to soften, melt and cut the wax therefrom while the lower portion is spaced from the candle to provide a downwardly facing open channel with the sidewall of the candle for permitting the formation and accumulation of melted wax drops therein which thereby fall downwardly and freely away from the candle surface.

10. A machine for making decorated candles comprising a framework, a headstock and a tailstock carried on said framework, a driving spindle journaled in said headstock, means for rotating said driving spindle, a driven head journaled for axial and rotatable movement in said tailstock, means for axially moving said driven head toward and away from said driving head to thereby selectively engage and rotate a candle therebetween in a fixed horizontal position on said machine, a yoke mounted to said framework for movement toward and away from said candle, a cutting and forming member carried on said yoke for making lateral contact at one side of said candle as the same is rotating, and means for heating said cutting and forming member.

11. A process for forming a decorative pattern on a preformed candle having a cylindrical sidewall comprising the steps of mounting and rotating the candle in a position such that the sidewall to be decorated is generally horizontally disposed, contacting the sidewall with the heated member to thereby create a warmed and softened outer layer of wax about the periphery of the candle, and thereafter impressing a heated forming member having a predetermined pattern thereon into the softened outer layer to thereby create a pattern on the candle corresponding to the member by the redistribution and melting of the softened outer layer of wax by said member.

12. The process for forming a decorative pattern on a preformed candle comprising the steps of mounting and rotating the candle in a position such that a sidewall to be decorated is generally horizontally disposed, contacting the sidewall with the heated forming member having a predetermined pattern thereon to thereby warm and soften the wax at the periphery of the candle, applying a surface coating of colored melted wax to portions of the candle and over said softened outer layer, and thereafter impressing the heated forming member into the softened sidewall and outer layer to thereby create a pattern on the candle by redistribution and melting of the softened wax.

References Cited
UNITED STATES PATENTS

| | | | |
|---|---|---|---|
| 88,779 | 4/1869 | Field et al. | 67—22.5 |
| 471,499 | 3/1892 | Forster | 67—22.5 |
| 1,596,017 | 8/1926 | Harnisch | 67—22.5 |
| 2,101,136 | 12/1937 | Fraternali | 67—22 X |
| 2,636,370 | 4/1953 | Kramer | 67—22.5 |

CHARLES J. MYHRE, *Primary Examiner.*